United States Patent Office 3,252,524
Patented May 24, 1966

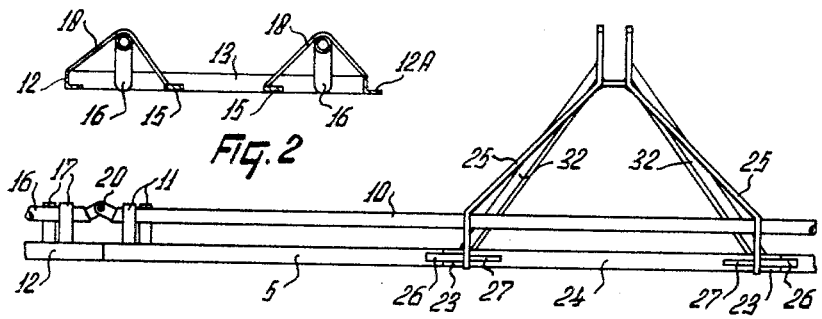
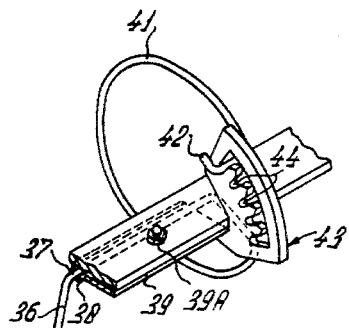
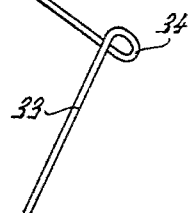

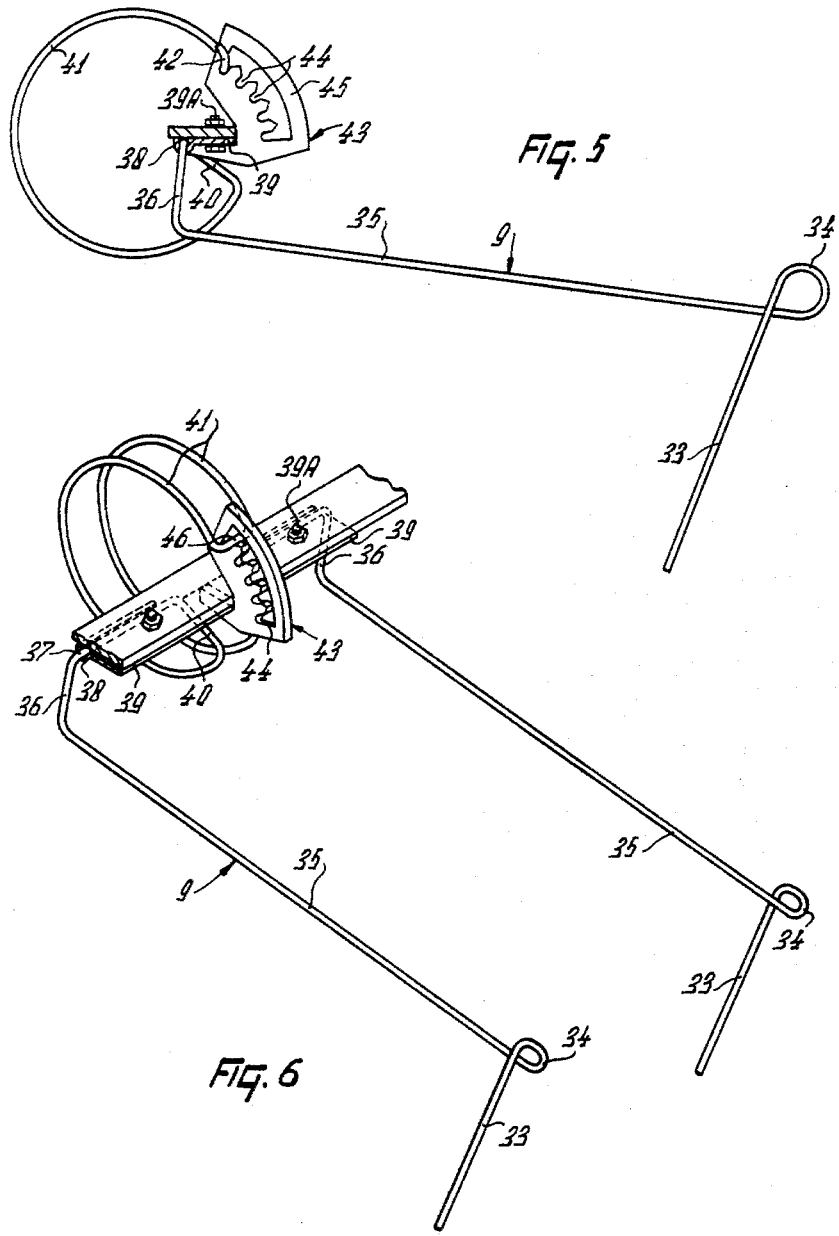

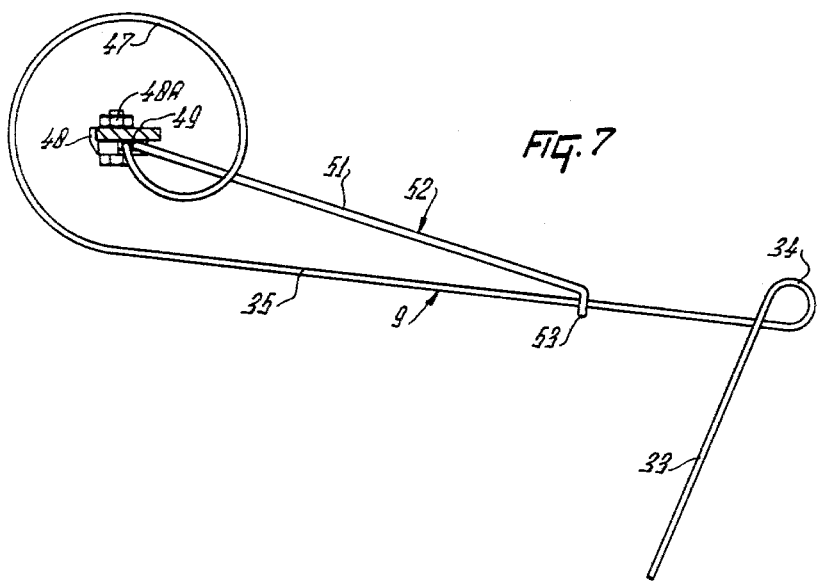
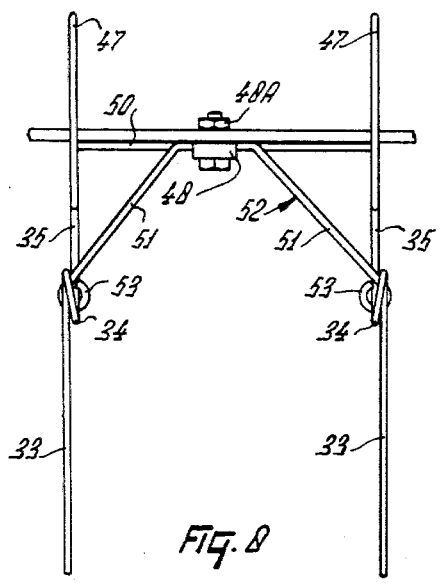

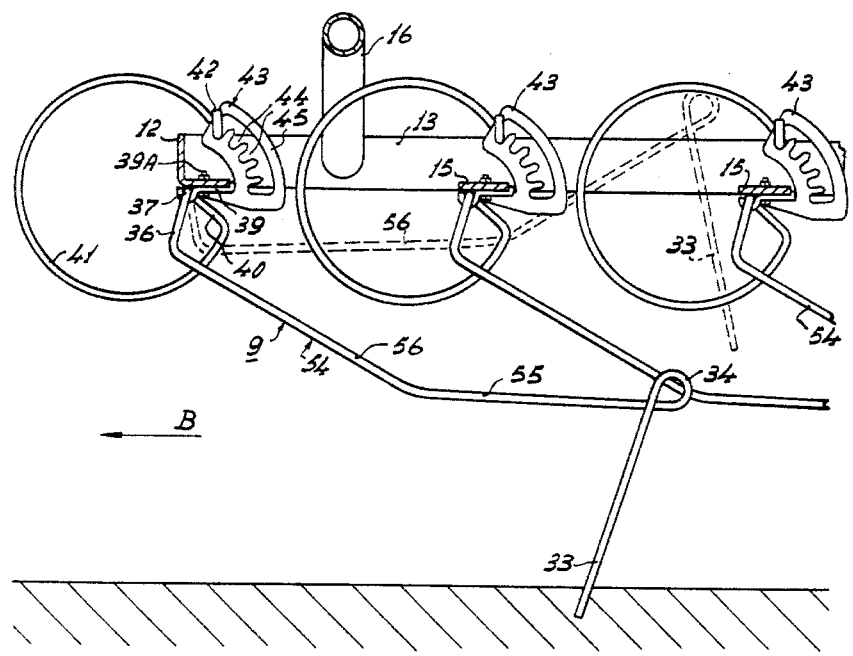

3,252,524
SOIL CULTIVATING IMPLEMENTS
Cornelis van der Lely, Zug, Switzerland, and Ary van der Lely, Maasland, Netherlands, assignors to C. van der Lely N.V., Maasland, Netherlands, a Dutch limited-liability company
Filed Nov. 6, 1964, Ser. No. 409,425
Claims priority, application Netherlands, Nov. 21, 1963, 300,830; July 2, 1964, 6,407,507
12 Claims. (Cl. 172—707)

The invention relates to a soil cultivating implement comprising tines of resilient material, the active portion of a tine being connected with the frame by means of a portion extending in the direction of propagation, the end of the latter portion connected with the active portion being freely movable.

The invention has for its object to provide a device of the kind set forth, in which the very flexible tines are arranged so that in operation they invariably occupy such a position that the work to be performed can be executed in a correct manner.

According to the invention there are provided means arranged at an angle to the direction of travel and serving for limiting a lateral deflection of the portion extending in the direction of travel and of the active portion of the tine.

For a better understanding of the invention and to show how the same may be readily carried into effect, reference is made by way of example to the accompanying drawing.

FIGURE 2 is a sectional view taken on the line II—II in FIGURE 1.

FIGURE 3 is an elevation in the direction of the arrow III in FIGURE 1 for part of the implement shown in said figure.

FIGURE 4 is a perspective view of a tine and its fastening to a support of the harrow shown in FIGURE 1.

FIGURE 5 is a side view of the tine of FIGURE 4.

FIGURE 6 is a perspective view of two tines made from a single piece of material and their fastening to a support of the harrow of FIGURE 1, each of the two tines being similar to the tine shown in FIGURES 4 and 5.

FIGURE 7 is a side elevation of a second embodiment of two tines made from one piece of material and their fastening to a support of the harrow of FIGURE 1.

FIGURE 8 is a rear view of the tines shown in FIGURE 7.

FIGURE 9 shows a further embodiment of a tine and its fastening to a support of the harrow of FIGURE 1.

Figure 1:
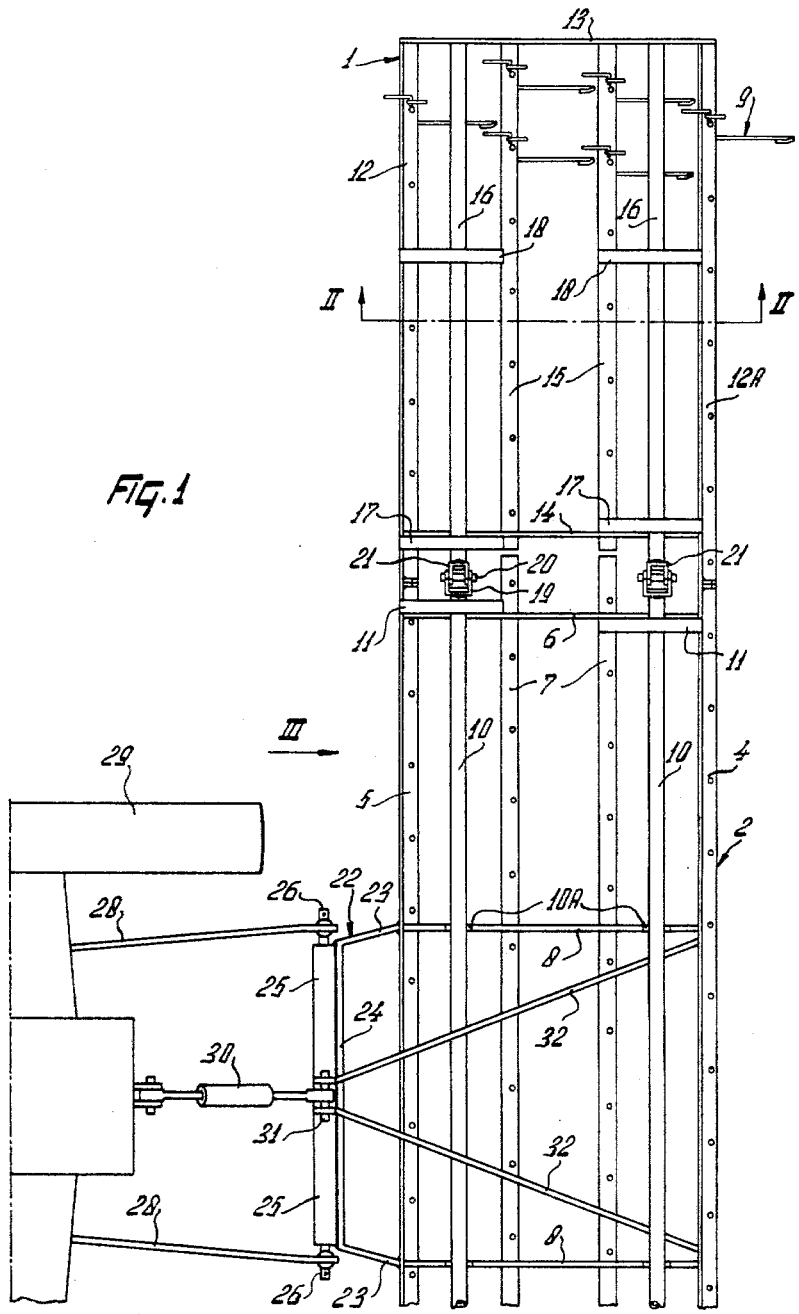
FIGURE 1 is a plan view of part of a soil cultivating implement according to the invention.

The implement shown in FIGURE 1 is formed by a weeding harrow comprising three pivotally intercoupled harrow sections lying side by side. An outer harrow section 1 and part of the central harrow section 2 are shown in the figure. The central harrow section comprises a frame formed by two beams 4 and 5, extending transversely of the direction of travel and formed by angle-section irons which are arranged so that one limb of an iron extends in a vertical direction and the other limb in a horizontal direction to the rear viewed in the direction of travel. The two beams 4 and 5 are coupled with each other near their ends by strips 6, extending in the direction of travel. Strip-shaped supports 7, extending transversely of the direction of travel are arranged in the harrow section at a distance from each other which is equal to their distance from the beams 4 and 5, said supports being connected with the strips 6 and with strips 8 which extend at equal distances from the center of the central harrow section between the beams 4 and 5. The beams 4 and 5 and the strip-shaped supports or beams 7 are provided with tines 9, the construction of which will be explained hereinafter.

Above the frame formed by the beams 4 and 5 and the strips 6 and 8 interconnecting said beams there are provided tubes 10, extending transversely of the direction of travel and located, as will be seen from FIGURE 1, between the beams 5 and 7 and 7, 4 respectively. The tubes 10 are connected with the strips 8 by means of supports 10A and near their ends by means of brackets 11 with a beam 4 and a beam 5 respectively and a strip-shaped support 7. The brackets 11 are located on either side of the strip 6. The outer harrow sections, pivotally coupled with the central harrow section, also comprise a frame which is formed by two beams 12 and 12A, extending transversely of the direction of travel and formed by angle-section irons, arranged in the same manner as those of the central harrow section 2. The beams 12 and 12A are interconnected at their ends remote from the central harrow section by means of a strip 13, extending in the direction of travel. Near the ends on the side of the central harrow section 2 the beams 12 and 12A are connected with each other by means of a strip 14, extending in the direction of travel. In the same manner as in the central harrow section the beams 12 and 12A have arranged between them strip-shaped supports or beams 15, extending transversely of the direction of travel and secured to the strips 13 and 14 and provided like the beams 12 and 12A with tines 9, to be described hereinbelow.

Like on the central harrow section 2, the outer harrow sections have also arranged above the framework formed by the beams 12 and 12A and the strips 13 and 14 interconnecting said beams tubes 16, which are connected on the side of the central harrow section, in the same manner as the tubes 10 of the central harrow field 2, by means of brackets 17 with the beams 12 and 12A and the strip-shaped supports 15. Near the center of the harrow section the tubes 16 are also connected by means of brackets 18 with the respective beams and strips. At the ends remote from the central harrow section 2 the tubes 16 are bent downwards and connected with the strip 13 (see FIGURE 2).

From FIGURE 1 it will be seen that each of the tubes 10 of the central harrow section 2 is provided at its end with a bracket 19, the limbs of which extend obliquely upwards and are coupled by means of a pivotal shaft 20, extending in the direction of travel, with the limbs of a bracket 21, also extending obliquely downwards and arranged at one end of the tubes 16 of the outer harrow section. From FIGURE 1 it is furthermore apparent that in operation the angle-section beams of the harrow sections are in contact with each other. The strip-shaped supports of the central harrow section 2 extend over a given distance beyond the ends of the angle-section beams 4 and 5, so that also between the pivotal joints of the harrow sections there may be arranged tines.

The central harrow section 2 is provided at the front end with a horizontal bracket 22, which is secured to the beam 5 at points lying at equal distances from the center. The fastening points of the bracket on the beam 5 coincide with the fastening points of the strips 8, extending in the direction of travel and connecting the beam 5 with the beam 4. The bracket 22 comprises two portions 23, extending slightly towards each other and interconnected by a portion 24, extending transversely of the direction of travel, parallel to the beam 5. This portion 24 is provided with two strips 25 approaching each other in a vertical direction and extending near their upper ends over a given distance parallel to each other, said portions being interconnected by a transverse piece 26 extending between said portions (see FIGURE 3).

At the lower ends of the strips 25 there are provided pins 27, by means of which the device can be attached to the lowermost arms 28 of the lifting device of a tractor 29. The upper arm 30 of said lift can be coupled by means of a pin 31 with the two upper parallel portions of the strips 25. The upper ends of the strips 25 are coupled with the hindmost beam 4 of the central harrow section 2 by means of sloping supports 32 extending away from each other to the rear. Said supports are arranged so that the tube 10 located on the rear side of the central harrow section 2 is disposed above said supports.

FIGURE 4 shows on an enlarged scale a tine 9, arranged on a strip-shaped support 15 of the harrow sections. Said tine, which is made of circular-section spring steel, comprises an active portion 33, extending towards the soil and terminating through a loop 34 in a portion 35 extending in the direction of travel, the length of said portion being at least twice the length of the active tine portion 33, said loop 34 being freely movable. The two tine portions are in this embodiment parallel to a vertical plane in the direction of travel. At the end remote from the active tine portion 33 the portion extending in the direction of travel is provided with a portion 36 bent over in upward direction and terminating in a portion 37, extending transversely of the direction of travel and hinged to the strip-shaped support 15. The portion 37 is held in a recess 38 of a fastening plate 39, which is secured to the support by means of a bolt 39A. The tine portion 37, extending transversely of the direction of travel, terminates in a portion 40, which extends to the rear, viewed in the direction of travel, and slightly in downward direction (see FIGURE 5).

The portion 40, which is pivotable with respect to the support, terminates in a portion 41, which is curved in the direction of travel so that it forms an arc of at least 180° and surrounds the support 15 for the major part, said portion forming a resilient element for the further tine portion. At its free end the portion 41, which is substantially parallel to a vertical plane in the direction of travel, is bent over transversely of the direction of travel so that a hook 42 is formed. The hook 42 is adapted to co-operate with an adjusting member which comprises, as will be seen from FIGURE 5, a vertical sector-shaped plate 43, which is secured to one end of the fastening plate 39 for a tine. The sector-shaped plate 43 is provided with a number of recesses 44 disposed on the arc of a circle and communicating with each other. By means of the hook 42 the resilient element formed by the curved portion 41, can be moved in a simple and ready manner at will into one of the recesses 44 of the sector-shaped plate 43, while the tine can be adjusted around the portion 37, extending transversely of the direction of travel and serving in this case as a pivotal shaft, so that the position of the tine can match the work to be performed. The portion 45 of the sector-shaped plate 43 opposite the recesses 44 serves as a stop, so that a movement of the resilient element out of the recesses 44 is limited. In a similar manner tines are secured to the beams 4 and 5, 12 and 12A and to the strip-shaped supports 7.

FIGURE 6 shows an embodiment in which two adjacent tines which correspond chiefly with the tine of the first-mentioned embodiment, are made as a whole from a single length of spring steel. The parts of the tines corresponding with those of the preceding embodiment are designated by the same reference numerals. Between the two arcuated portions 41 of the tines there is disposed a portion 46, which extends transversely of the direction of travel and which is adapted to co-operate with the recesses 44 of the sector-shaped plate 43, which, in this embodiment, is arranged at the center of the fastening plate 39. In contrast to the structure shown in FIGURE 4, the fastening plate 39 of this construction is secured by means of two bolts 39A to the strip-shaped support 15.

FIGURES 7 and 8 show a third embodiment in which also two adjacent tines are made from a single length of circular-section spring steel. The portions similar to those of the preceding embodiments are denoted by the same reference numerals. From these figures it will be apparent that the tines are provided with arcuated portions 47, forming resilient elements and joining directly to the portion 35 of the tines extending in the direction of travel and like in the preceding embodiments the arc amounts to at least 180°, said portions surrounding the support for the major part. In this embodiment the portions 47 are located on either side of a fastening plate 38, which is secured by means of a bolt 38A to a support and which is provided with a recess 49 accommodating the portion 50 extending between the arcuated portions 47. Between the support to which the tine is secured and the tine portion 35, extending in the direction of travel, there is arranged a connecting element 51. In the embodiment shown two connecting elements 51 are made from a single length of spring steel and constitute the limbs of a bracket 52, which is hinged by means of its pieces 53 between said limbs, in the recess 49 provided in the fastening plate 48, so that the connecting elements are adapted to hinge about an axis which substantially coincides with the center line of the portion 50, about which the tines are adapted to pivot in their deflection in a vertical direction. The ends 53 of the connecting elements 51 are bent around the portions 35 and constitute guide members 53, which are movably coupled with the tine portions 35, extending in the direction of travel.

The embodiments described above operate as follows.

In operation the three harrow sections occupy the positions shown in FIGURE 1; they are moved in the direction of the arrow P. The active portions 33 of the tines 9 are thus dragged through the soil, so that the weeds are torn from between the crop plants. In order to prevent the tines from pulling out also the crop plants, the construction of the tines is such that they can deflect very readily. There are provided, in the embodiment shown in FIGS. 7 and 8, means for preventing a lateral deflection of the portion 35 extending in the direction of travel and of the active portion 33 of the tine. The deflection of the tine is in this construction affected so that a flexible movement in upward direction is not counteracted, whereas a lateral deflection is limited to an extent such that the active portion is held in the correct track and cannot take the way of least resistance as a result of the great flexibility of the tine, so that it might reach the track of a preceding tine, which would considerably reduce the effect of harrowing.

In order to avoid undesirable vertical deflections the embodiment shown in FIGS. 4 to 6 comprise the fastening members 43, 42 for the support 15, which is located at the side of the portion 35, viewed in the direction of travel, said portion being hinged to the support by means of an axis extending in the direction of travel and formed by the center line of the portion 37.

In the construction shown in FIGURE 7 the means for restricting a lateral deflection of a tine comprise the connecting element 51, which is disposed between the support 15 for the tine and the tine portion 35, extending in the direction of travel and is movably coupled with said portion.

The construction according to the invention ensures in a simple manner a satisfactory operation of the weeding harrow equipped with very flexible tines.

With the tine shown in FIGURE 9, which is connected with a support of the frame in the same manner as the tines described in the above embodiments and which chiefly corresponds with said tines, the portion 54, extending in the direction of travel, comprises two straight or substantially straight portions 55 and 56, arranged at an angle to each other, the connecting portion between said portions being located, in operation, in front of or substantially beneath the support located behind the support to which the portion 54 is secured. Said portions extend substantially parallel to a vertical plane in the direction of travel. The angle between the two portions 55 and 56 is obtuse and its peak is directed downwardly and it may be at least 150°. The length of the portions 55 and 56 is, as is shown in FIGURE 9, substantially the same and equalizes the length of the active portion 33. In operation, the portion 55 of the part 54, which is hindmost viewed in the direction of travel, extends substantially in a horizontal direction. With the tine shown in FIGURE 9 the active portion is capable of moving upwardly, in operation, between two supports to a considerable extent (see the position indicated in broken lines), so that an extremely heavy stress on the active portion, when very great soil accumulations have to be stirred up, is avoided.

What we claim is:

1. A soil cultivating implement, having a tined frame and at least one resilient tine, said tine having a soil-engaging active portion connected to the frame through the intermediary of a further portion, said further portion extending in the direction of travel, the front end of said further portion being connected to a third portion which extends transversely to the direction of travel, said third portion being hingeably connected to the frame and connected to a curved spring, said spring being supported on the frame and at least partly surrounding said frame, and means for connecting said spring to said frame.

2. The invention of claim 1, wherein the spring is curved through an arch of at least 180°.

3. The invention of claim 1, wherein the spring extends substantially in the direction of travel.

4. The invention of claim 1, wherein the third portion is integral with said spring.

5. The invention of claim 1, wherein one end of the curved spring is coupled to the said third portion, the other end of said spring being in engagement with retaining means secured to the frame, said retaining means having stops and said spring being engageable in any one of said stops.

6. A soil cultivating implement having a tined frame and at least two adjacent tines, each of said tines having a soil-engaging active portion connected to the frame through the intermediary of a further portion extending in the general direction of travel, substantially straight retaining means located between the frame and said further portion, said retaining means being pivotably supported on the frame and slidably connected with said further portion, said adjacent tines each being connected to adjacent retaining means connected by a connecting element and said element being pivotably supported on the frame.

7. The invention of claim 6, wherein the said means for the further portion of each tine comprises a spring.

8. The invention of claim 7, wherein the said springs are connected by a piece, which is pivotably supported on the frame.

9. A soil cultivating implement, having a tined frame and resilient tines with soil-engaging active portions, said active portions hingeably connected to the frame through the intermediary of a further portion extending in the direction of travel, said further portion being connected to a spring which is supported by said frame, a plurality of supports on the frame for supporting said tines, said further portion of each tine being greater in length than the distance between adjacent supports, said further portion comprising two sections arranged at an angle to each other and connected by a bridging part, said bridging part being located beneath a support, which with respect to the intended direction of travel lies behind the support to which the tine in question is connected.

10. The invention of claim 9, wherein the sections have approximately the same length.

11. The invention of claim 9, wherein the two sections are angled at an obtuse angle and a peak of the angle includes the bridging part, said part being directed downwardly.

12. The invention of claim 9, wherein the length of the active portion of each tine is approximately equal to the length of each of said sections.

References Cited by the Examiner

UNITED STATES PATENTS

| | | | |
|---|---|---|---|
| 354,557 | 12/1886 | LaDow | 172—707 X |
| 468,446 | 2/1892 | Brooks | 172—707 X |
| 724,175 | 3/1903 | Fuller | 172—707 X |
| 796,667 | 8/1905 | Marsalis | 172—643 X |
| 822,795 | 6/1906 | Wickham | 172—707 X |
| 839,310 | 12/1906 | Nelson | 172—707 X |
| 1,112,045 | 9/1914 | Young | 172—707 |
| 2,772,618 | 12/1956 | Schmidt | 172—71 X |
| 2,990,021 | 6/1961 | Johnson et al. | 172—643 |

FOREIGN PATENTS

| | | |
|---|---|---|
| 702,466 | 1/1941 | Germany. |

ABRAHAM G. STONE, *Primary Examiner.*

ANTONIO F. GUIDA, *Examiner.*

J. R. OAKS, *Assistant Examiner.*